US012762722B2

(12) United States Patent
Nakata

(10) Patent No.: US 12,762,722 B2
(45) Date of Patent: Oct. 13, 2026

(54) INFORMATION PROCESSING APPARATUS, CONTROL METHOD THEREOF, AND RECORDING MEDIUM

(71) Applicant: CANON KABUSHIKI KAISHA, Tokyo (JP)

(72) Inventor: Masato Nakata, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 334 days.

(21) Appl. No.: 18/536,443

(22) Filed: Dec. 12, 2023

(65) Prior Publication Data

US 2024/0221196 A1 Jul. 4, 2024

(30) Foreign Application Priority Data

Dec. 28, 2022 (JP) ................................ 2022-212412

(51) Int. Cl.

| | |
|---|---|
| ***G06T 7/50*** | (2017.01) |
| ***G06T 7/11*** | (2017.01) |
| ***G06V 10/44*** | (2022.01) |
| ***G06V 10/60*** | (2022.01) |
| ***G06V 10/75*** | (2022.01) |

(52) U.S. Cl.

CPC .................. *G06T 7/50* (2017.01); *G06T 7/11* (2017.01); *G06V 10/44* (2022.01); *G06V 10/60* (2022.01); *G06V 10/758* (2022.01)

(58) Field of Classification Search

CPC ... G06T 7/50; G06T 2207/10028; G06T 7/11; G06T 5/60; G06V 10/50; G06V 10/82; G06V 10/40; G06V 10/44; G06V 10/758; G06N 3/02

See application file for complete search history.

(56) References Cited

FOREIGN PATENT DOCUMENTS

JP 2021-144589 A 9/2021

OTHER PUBLICATIONS

M. Tallón, S. Derin Babacan, J. Mateos, M. N. Do, R. Molina and A. K. Katsaggelos, "Upsampling and denoising of depth maps via joint-segmentation," 2012 Proceedings of the 20th European Signal Processing Conference (EUSIPCO), Bucharest, Romania, 2012, pp. 245-249. (Year: 2012).*

* cited by examiner

*Primary Examiner* — Matthew C Bella
*Assistant Examiner* — Janice E. Vaz
(74) *Attorney, Agent, or Firm* — Carter, DeLuca & Farrell LLP

(57) ABSTRACT

An information processing apparatus comprising a division processing unit configured to divide each of input depth data and image data corresponding to the input depth data and having a higher resolution than the input depth data into a plurality of divided regions; an inference processing unit configured to infer depth data by complementing input depth data with image data for each of the divided regions; and a combining processing unit configured to combine depth data having a higher resolution than that of input depth data by combining inferred depth data, wherein the division processing unit performs division such that each divided region has an overlap region partially overlapping with an adjacent divided region.

9 Claims, 10 Drawing Sheets

INFORMATION PROCESSING APPARATUS, CONTROL METHOD THEREOF, AND RECORDING MEDIUM

BACKGROUND OF THE INVENTION

Field of the Invention

The present disclosure relates to processing of depth data.

Description of the Related Art

In object recognition in the fields of automatic driving and robotics, video production, and the like, it is necessary to use depth data such as distance information, depth information, and defocus information. It is desirable that the depth data has high accuracy and high resolution. As one of methods for acquiring high-accuracy and high-resolution depth data, there is a method of using an inference device including a neural network in which parameters are learned in advance by learning processing. Hardware including an inference device has restrictions on specifications such as arithmetic performance, memory bandwidth, communication performance, and arithmetic device, and a method of reducing and dividing input data, performing inference processing, and then combining and integrating the input data in order to acquire dept data has been proposed. In a case in which the integration processing is performed after the original image is divided and the inference processing is performed, inconsistency of output data may occur at a boundary portion of the divided images. Japanese Patent Application Laid-Open No. 2021-144589 discloses a method of inputting compressed data of original data, in addition to divided images, to an inference device, performing inference processing, and then performing second inference processing (integration processing).

However, in the method disclosed in Japanese Patent Application Laid-Open No. 2021-144589, data synchronization in a neural network intermediate layer and the second inference processing are required to solve the boundary inconsistency due to the division processing of the original image. As a result, the load of processing related to the combination of the inference result using the divided input data increases and the processing speed decreases.

SUMMARY OF THE INVENTION

In the present invention, high-resolution depth data are combined while suppressing the decrease in processing speed.

An information processing apparatus of the present invention comprising: at least one processor and/or circuit configured to function as following units: a division processing unit configured to divide each of input depth data and image data corresponding to the input depth data and having a higher resolution than the input depth data into a plurality of divided regions; an inference processing unit configured to infer depth data by complementing input depth data with image data for each of the divided regions; and a combining processing unit configured to combine depth data having a higher resolution than that of input depth data by combining inferred depth data in the divided regions, wherein the division processing unit performs division such that each divided region has an overlap region partially overlapping with an adjacent divided region.

Further features of the present invention will become apparent from the following description of exemplary embodiments with reference to the attached drawings.

DESCRIPTION OF THE EMBODIMENTS

First Embodiment

Figure 1:
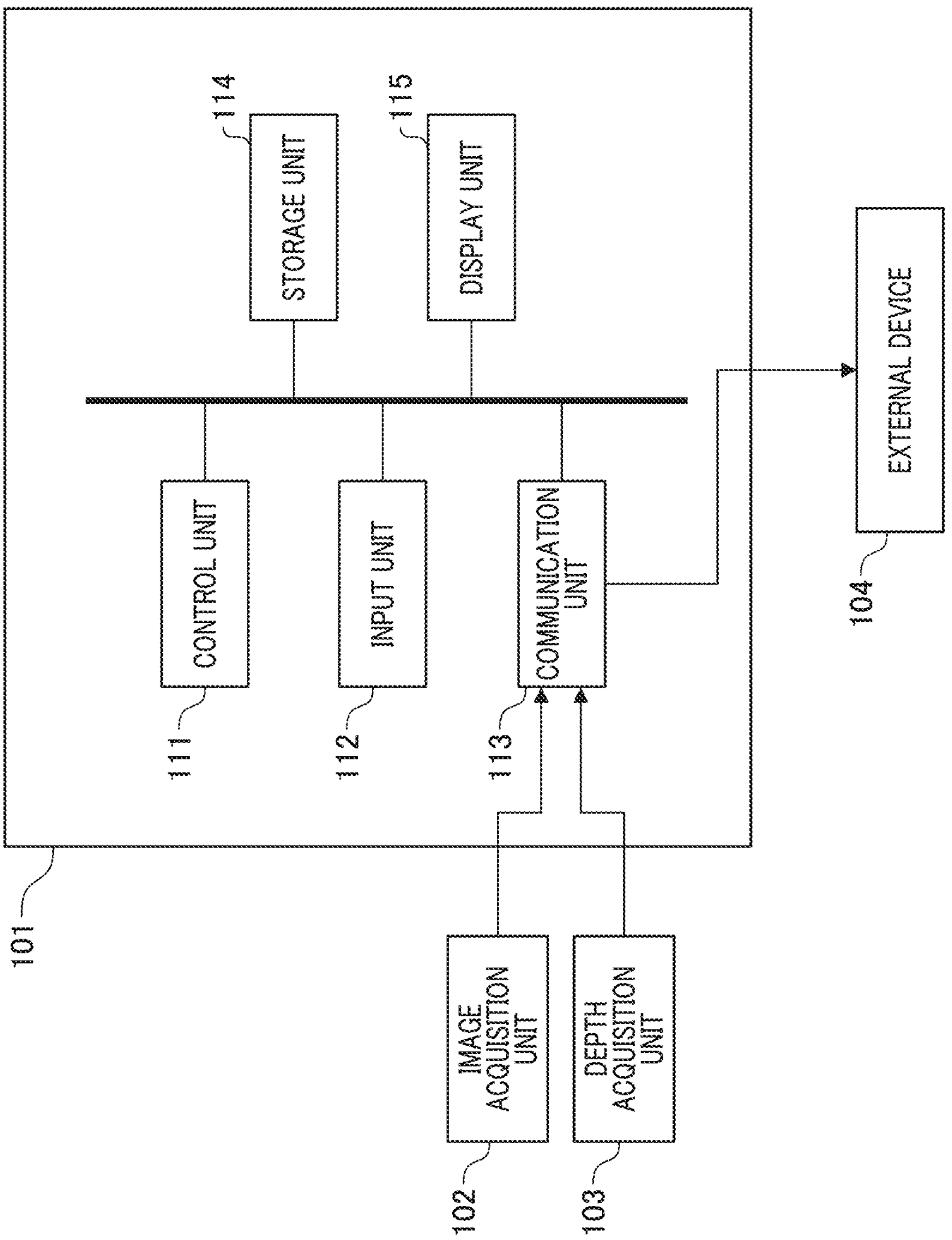
FIG. 1 is a diagram showing a configuration of a system for processing depth data.

FIG. 1 is a diagram showing a configuration of a system for processing depth data. The system includes an information processing apparatus 101, an image acquisition unit 102, a depth acquisition unit 103, and an external device 104. The information processing apparatus 101 is an apparatus that generates high-resolution depth data by performing complementation processing for complementing input depth data by using image data having a higher resolution than the input depth data. The information processing apparatus 101 includes a control unit 111, an input unit 112, a communication unit 113, a storage unit 114, and a display unit 115.

The control unit 111 is, for example, a central processing unit (CPU), a graphical processing unit (GPU), a field programmable gate array (FPGA), and the like. The control unit 111 controls the entire information processing apparatus 101. The input unit 112 receives an operation, an input, or an instruction from a user. The input unit 112 has, for example, a keyboard, a mouse, and a touch panel for operating the information processing apparatus 101, and receives an input from the user.

The communication unit 113 is an interface for exchanging information with an external device. The communication unit 113 has an interface, for example, Ethernet, a mobile industry processing interface (MIPI), an inter-integrated circuit (I2C), and the like. Additionally, the communication unit 113 may have an interface, for example, a serial peripheral interface (SPI), a high-definition multimedia interface (HDMI) (registered trademark), a USB, and the like.

In the present embodiment, the communication unit 113 is communicably connected to the image acquisition unit 102, the depth acquisition unit 103, and the external device 104. The image acquisition unit 102 is an imaging apparatus that captures an image. The imaging apparatus includes an image sensor, for example, a CCD, a metal-oxide-semiconductor (MOS), and a CMOS, outputs an output signal corresponding to an optical image, and generates an image corresponding to the output signal.

The depth acquisition unit 103 is a light detection and ranging (LiDAR) device that acquires distance information. The depth acquisition unit 103 acquires depth data by, for example, a ranging device based on disparity information of a plurality of image sensors, laser light irradiation, and reflected light reception. The depth data are distance information (depth information). Additionally, the depth data may include parallax information and defocus information. The external device 104 is a device for the purpose of recording, processing, and using depth data generated by the information processing apparatus. The external device 104 is a hardware control device, a workstation, a server, and the like. Note that the information processing apparatus 101 and the external device 104 may be realized by, in addition to one or more information processing devices, a virtual machine (cloud service), using resources provided by a data center including the information processing apparatus, or a combination thereof.

The storage unit 114 has a read only memory (ROM), a random access memory (RAM), a hard disk drive (HDD), a solid state drive (SSD), and the like. A boot program of the system and various control programs are stored in the ROM. The RAM is a work memory that the control unit 111 operates. The control unit 111 controls the information processing apparatus 101 by loading a program stored in the ROM into the RAM and executing the program. The HDD and the SSD are non-volatile storage media that store various data and parameters.

The display unit 115 is an output device for displaying an operation screen of the information processing apparatus 101 and input/output data to a user. The display unit 115 includes, for example, a liquid crystal display (LCD). Note that the display unit 115 and the input unit 112 may be realized as a touch panel capable of performing a touch operation using an electrostatic method, a pressure sensitive method, and the like. It is possible to configure a GUI as if the user can directly operate the screen displayed on the touch panel by associating the input coordinates and the display coordinates on the touch panel.

Figure 2:
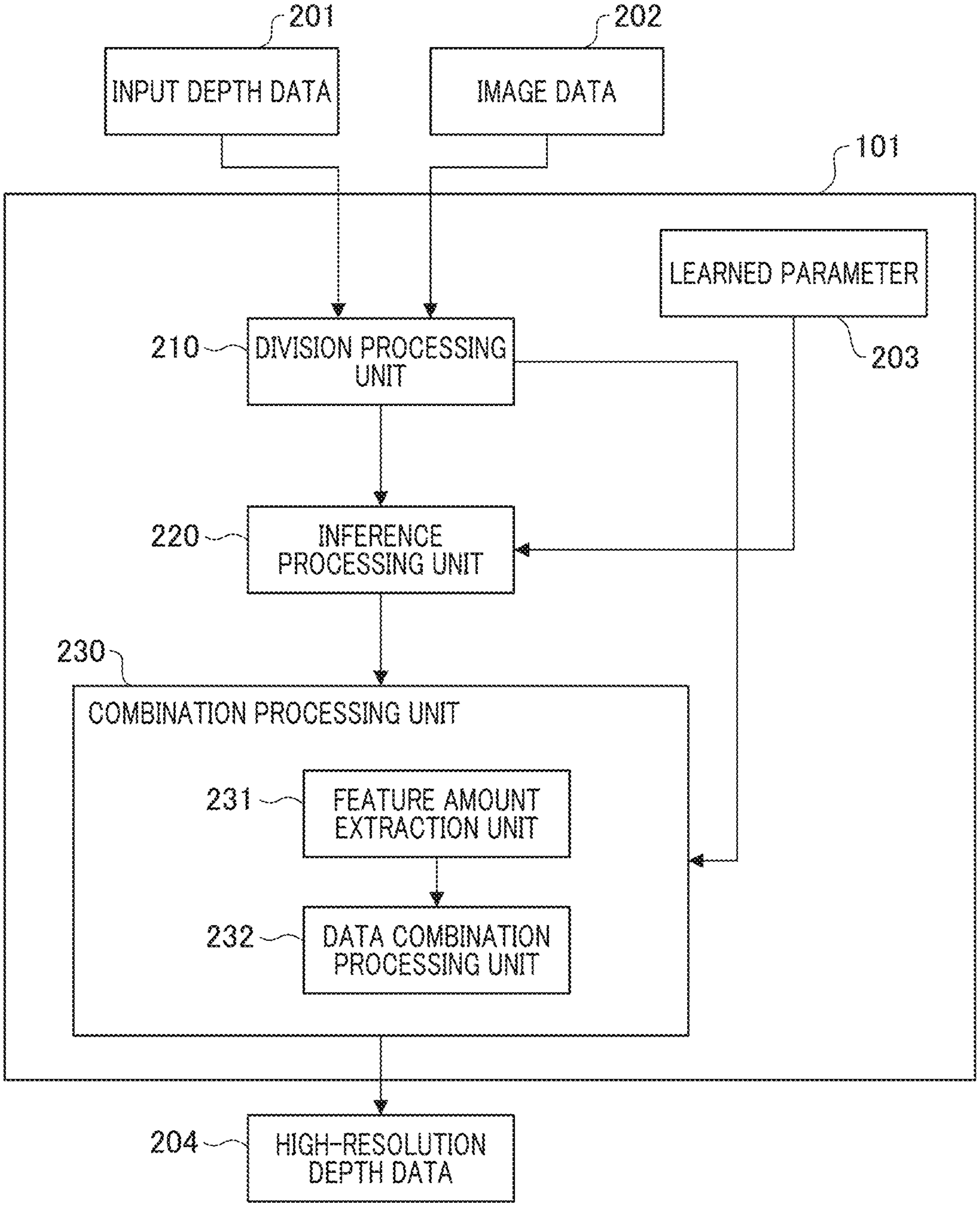
FIG. 2 is a diagram showing a software configuration of an information processing apparatus.

A software configuration and a process flow according to the information processing apparatus 101 will be explained with reference to FIG. 2. FIG. 2 is a diagram illustrating a software configuration of the information processing apparatus 101. The information processing apparatus 101 includes a division processing unit 210, an inference processing unit 220, and a combination processing unit 230. The combination processing unit 230 includes a feature amount extraction unit 231 and a data combination processing unit 232. Additionally, the information processing apparatus 101 has a learned parameter 203. Each unit of the information processing apparatus 101 as shown in FIG. 2 is realized by a processor executing a program that is stored in the memory.

The information processing apparatus 101 performs processing of acquiring an input depth data 201 and an image data 202 and outputting high-resolution depth data 204 that has been generated based on these data. The input depth data 201 is the depth data acquired by the depth acquisition unit 103. The input depth data 201 may be either the relative distance data or the absolute distance data. The information processing apparatus 101 acquires the input depth data 201 from the depth acquisition unit 103. The image data 202 is an image having a resolution higher than that of the input depth data 201 and is, for example, an RGB image. The image data 202 may be one or more of a color image and a monochrome image. The information processing apparatus 101 acquires the image data 202 from the image acquisition unit 102. The high-resolution depth data 204 are output data of the information processing apparatus 101, and are depth data having a resolution higher than that of the input depth data 201. The information processing apparatus 101 outputs the high-resolution depth data 204 to the external device 104.

The division processing unit 210 reads out the input depth data 201 and the image data 202 stored in the storage unit 114 via the communication unit 113, and performs division processing of dividing each of the input depth data and the image data into a plurality of depth data and a plurality of image data. In the present embodiment, the regions of the divided depth data and image data have an overlap region between adjacent divided regions, that is, data overlap. That is, when the division processing unit 210 divides the input depth data 201 into a plurality of image data, the division processing unit 210 divides the input depth data 201 into a plurality of depth data such that adjacent divided regions overlap each other. Similarly, when the division processing unit 210 divides the image data 202 into a plurality of image data, the division processing unit 210 divides the image data 202 into a plurality of image data such that adjacent divided regions overlap each other. The division processing unit 210 outputs the plurality of pieces of divided depth data and image data to the inference processing unit 220.

The inference processing unit 220 acquires the depth data and the image data divided into a plurality of pieces from the division processing unit 210, performs inference processing of inferring the depth data by complementing the depth data with the image data for each divided region, and generates high-resolution depth data for each divided region. The inference processing unit 220 generates high-resolution depth data for each divided region by processing the plurality of divided regions of the depth data and the image data by using a neural network. The high-resolution depth data are depth data having a higher quality, that is, a higher resolution, than the input depth data 201. The learned parameter 203 of the neural network is a parameter determined in advance by machine learning such as deep learning, and is stored in the storage unit 114. The inference processing unit 220 reads out the learned parameter 203 from the storage unit 114 when performing the inference processing, and uses the learned parameter for the inference processing.

The inference process will be explained here. The inference processing unit 220 performs the inference processing using a neural network structure to output high-resolution depth data from input low-resolution depth data and high-resolution image data. One of the representative methods of the inference processing is a spatial propagation network (SPN) model-based method. The SPN model-based method is a method for acquiring high-resolution depth data by spatially propagating low-resolution depth data using a feature amount of high-resolution data such as an image. Since the SPN model-based method can be regarded as complementation processing of low-resolution depth data, when the original data undergo division processing as in the present embodiment, a difference occurs in the overlap region depth data between the divided regions due to a difference in the original data and complementation kernel.

Note that although, in the present embodiment, an example in which the inference processing unit 220 uses the SPN model-based method will be explained, it is also possible to use another known method of acquiring high-resolution depth data using a low-resolution depth and high-resolution data. For example, the inference processing performed by the inference processing unit 220 can also be executed by a processing method based on a method for acquiring high-resolution depth data using a depth map and a residual map, such as a residual depth model (RDM).

The combination processing unit 230 generates the high-resolution depth data 204 by combining the high-resolution depth data in the divided region that has been output from the inference processing unit 220 using the division processing information such as the overlap region in the division processing unit 210. The combination processing unit 230 has the feature amount extraction unit 231 and a data combination processing unit 232. The feature amount extraction unit 231 extracts a feature amount of data for all data or a specific region. The feature amount extracted by the feature amount extraction unit 231 is, for example, one or more statistical indices of distance information (depth value), color space information of image data, luminance information of image data, and defocus information in the high-resolution depth data that have been output from the inference processing unit 220. The statistical index is, for example, a variation and a gradient. The data combination processing unit 232 generates the high-resolution depth data 204 by combining the high-resolution depth data in the divided region that have been output from the inference processing unit 220 based on the feature amount of data extracted by the feature amount extraction unit 231.

Figure 3A:
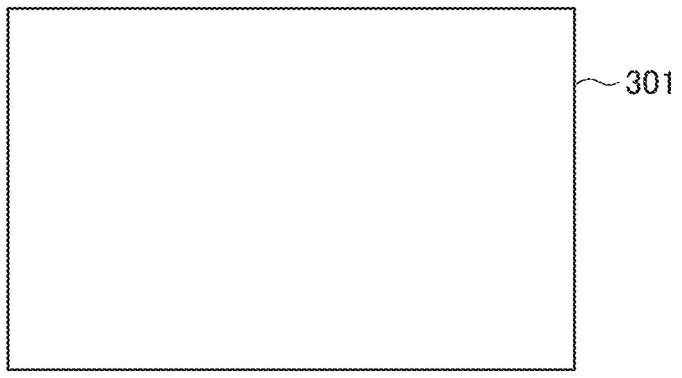
FIGS. 3A to 3C are diagrams that explain the division processing in the first embodiment.
Figure 3B:
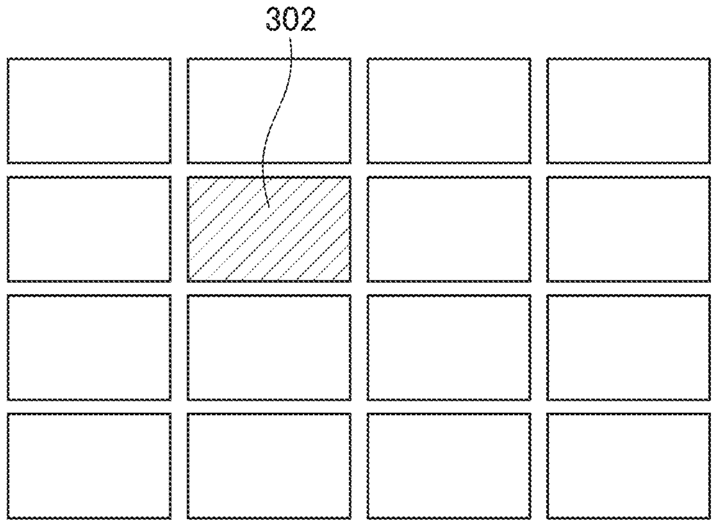
Figure 3C:
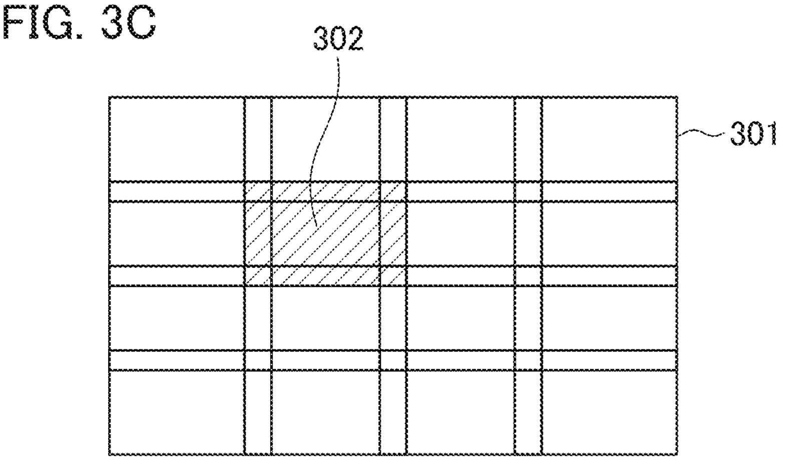

The division processing in the first embodiment will be explained with reference to FIGS. 3A to 3C. FIGS. 3A to 3C are diagrams that explain the division processing in the first embodiment. Although, in this context, the input depth data 201 that are low-resolution depth data will be explained as an example, the same applies to the image data 202 that is a high-resolution image. The input depth data 201 that is low-resolution depth data are data such as a point group, and as depth data, the information processing apparatus 101 stores the input depth data 201 as two-dimensional data.

FIG. 3A is a diagram illustrating original data before the division processing is performed. An original data 301 are the input depth data 201 that are input from the depth acquisition unit 103 to the division processing unit 210 of the information processing apparatus 101. Although, in this context, an example in which the original data 301, which that are the input depth data 201, are divided into 16 (4×4) regions will be explained, the number of divisions is not limited thereto.

FIG. 3B is a diagram showing divided regions. It shows an example in which the division processing unit 210 divides the original data 301 into 4×4 divided regions. The division processing unit 210 performs division such that the divided regions partially overlap with adjacent divided regions. FIG. 3C is a diagram showing overlap of adjacent divided regions. A divided region 302 to which texture has been applied has an overlap region that partially overlaps with adjacent divided regions. Similarly, all the divided regions have an overlap region that partially overlaps with adjacent divided regions.

Figure 4:
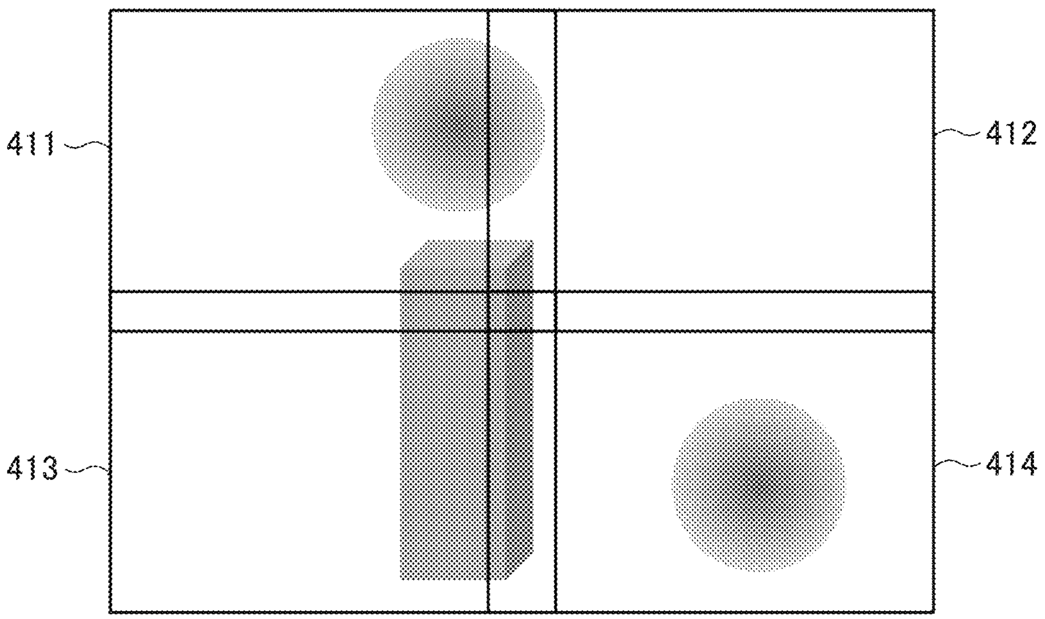
FIG. 4 is a diagram showing divided regions.

The processing performed by the combination processing unit 230 will be explained with reference to FIG. 4 to FIG. 6C. FIG. 4 is a diagram showing divided regions. As an example, a space in which two spheres and one rectangular column are arranged is defined as a measurement target. The image acquisition unit 102 captures an image of a measurement target space, generates image data 202, and outputs the image data 202 to the information processing apparatus 101. The depth acquisition unit 103 measures the measurement target space, generates the input depth data 201, and outputs the input depth data 801 to the information processing apparatus 101. The division processing unit 210 of the information processing apparatus 101 divides each of the image data 202 and the input depth data 201, which are original data, into four (2×2) divided regions 411 to 414. Each of the divided regions 411 to 414 has a region overlapping with adjacent divided regions. For example, a portion of the divided region 411 overlaps with the divided region 412, the divided region 413, and the divided region 414. The inference processing unit 220 acquires high-resolution depth data by the inference processing, for each of the divided regions 411 to 414.

The feature amount extraction unit 231 of the combination processing unit 230 extracts a feature amount of the overlap region of the high-resolution depth data. In the present embodiment, an example will be explained in which a variation in the distance information (depth value) of the depth data is extracted as the feature amount. In this context, an explanation is given by focusing on the overlap region between the divided region 411 and the divided region 412. In the overlap region between the divided region 411 and the divided region 412, there is a difference produced between the high-precision depth data of each of the divided region 411 and the high-precision depth data of the divided region 412, which are output from the inference processing unit 220.

Figure 5:
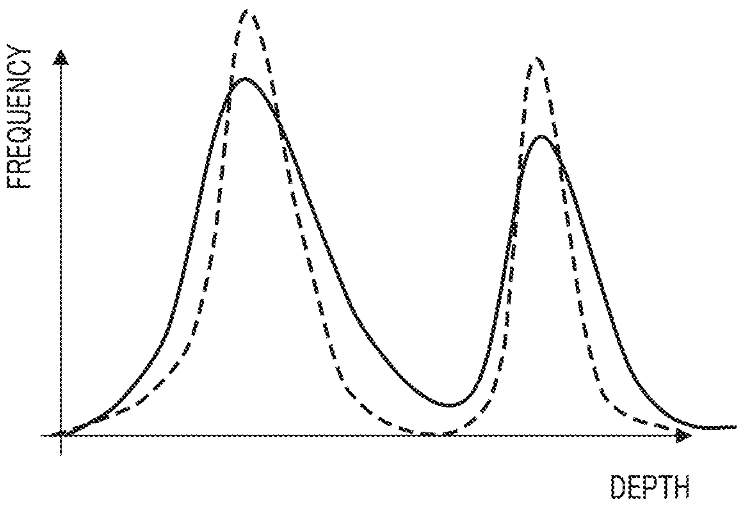
FIG. 5 is a diagram that explains the frequency distribution of the depth of the overlap region.

FIG. 5 is a diagram that explains the frequency distribution of the depth of the overlap region in the divided region 411 and the divided region 412. In FIG. 5, the horizontal axis represents the depth, and the vertical axis represents the frequency of the depth. The solid line represents the frequency distribution of the depth of the overlap region of the divided region 411, and the broken line represents the frequency distribution of the depth of the overlap region in the divided region 412. In FIG. 5, each of the two frequency distributions has two peaks. A short-distance peak with a small depth, that is, the left peak in FIG. 5, corresponds to the object shown in FIG. 4 and a long-distance peak with a large depth, that is, the right peak in FIG. 5, corresponds to the background shown in FIG. 4.

As shown in FIG. 5, even in the same overlap region, there is a difference in depth distribution between the overlap region in the divided region 411 and the overlap region in the divided region 412. Specifically, in the overlap region of the divided region 411, the peak of the depth frequency distribution is low and gentle for both the near distance and the far distance, and the depth varies, as compared to the overlap region of the divided region 412. The reason for this will be explained below. Although, in the divided region 411, an object is present in the vicinity of the inner side of the overlap region, in the divided region 412, no object is present in the vicinity of the inner side of the overlap region. The depth data of the object that is present in the vicinity of the inner side of the overlap region contributes to the inference processing of the depth data of the overlap region in the divided region 411 that is performed by the inference processing unit 220. Therefore, the peak of the frequency distribution of the depth of the overlap region in the divided region 411, to which the depth data of the object that is present in the vicinity of the inner side of the overlap region contributes, is wider than that of the divided region 412 to which the depth data of the object that is present in the vicinity of the inner side of the overlap region does not contribute.

Figure 6A:
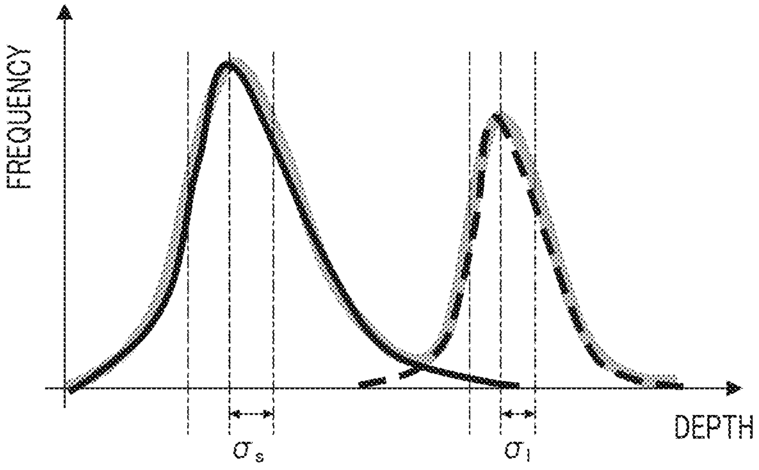
FIGS. 6A to 6C are diagrams that explain the feature amount extraction processing.
Figure 6B:
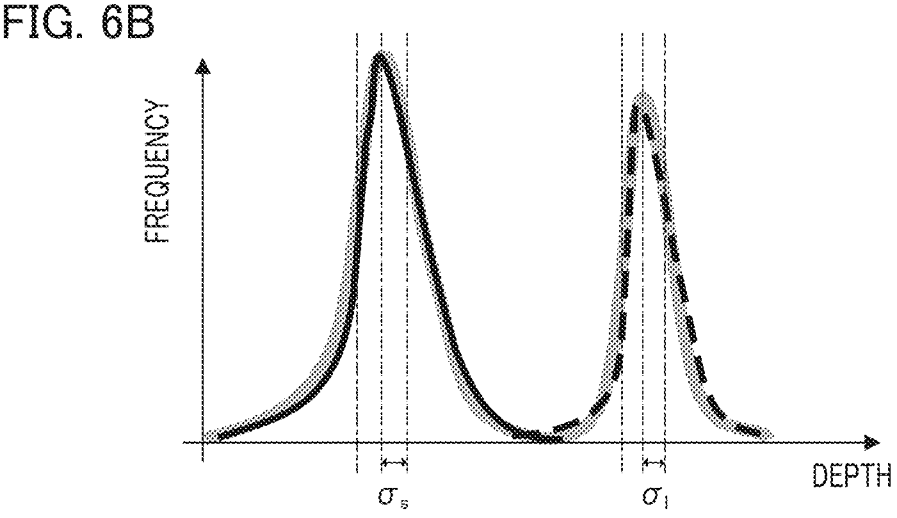
Figure 6C:
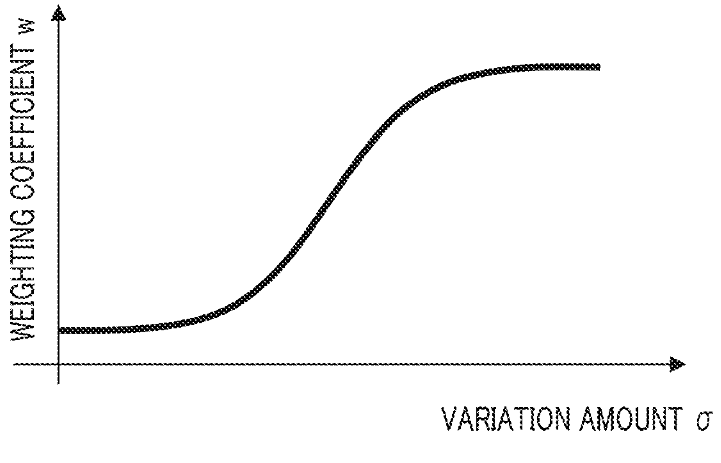

The feature amount extraction processing performed by the feature amount extraction unit 231 will be explained with reference to FIGS. 6A to 6C. FIGS. 6A to 6C are diagrams that explain the feature amount extraction processing. FIG. 6A illustrates the depth frequency distribution of the divided region 411. FIG. 6B illustrates the depth frequency distribution of the divided region 412. The feature amount extraction unit 231 performs fitting by superposition of a plurality of distribution functions based on the depth frequency distribution in the overlap region in each divided region, and obtains the amount of variation of each distribution function. Although, in the examples as illustrated in FIG. 6A and FIG. 6B, the depth frequency distribution of the divided region indicated by gray is expressed by superposition of two distribution functions indicated by a black solid line and a black broken line, the number of distribution functions is not limited thereto. For example, the depth may be expressed by superposition of three or more distribution functions. The feature amount extraction unit 231 calculates a variation amount of each of the plurality of distribution functions. In the examples as illustrated in FIG. 6A and FIG. 6B. the feature amount extraction unit 231 calculates the variation amount $\sigma_s$ of the short-distance distribution function and the variation amount $\sigma_1$ of the long-distance distribution function. Then, the feature amount extracting unit 231 obtains the total variation amount σ by function or table reference based on each variation amount.

FIG. 6C is a diagram showing a weighting function. In FIG. 6C, the horizontal axis represents the variation amount σ, and the vertical axis represents the weighting coefficient w. The depth of the overlap region between the divided region 411 and the divided region 412 can be obtained by multiplying the depth of the overlap region of each divided region by a weighting coefficient, and adding them together. In a case in which the object overlaps the overlap region or is present in the vicinity of the overlap region, it is desirable that the depth of the object is reflected in the depth of the overlap region. For this reason, in the present embodiment, the combining processing is performed such that data of a divided region having a larger variation amount σ in the overlap region is weighted more (heavier) by utilizing the fact that the variation amount σ is larger when an object is located in the vicinity of the overlap region. As the weighting function, it is assumed that the weighting coefficient increases as the variation amount increases, and the weighting function can also be defined using a sigmoid function, a tanh function, and the like. Additionally, the relation between the weighting function and the variation amount may be held in advance as a table value. The depth d of the overlap region is calculated by using a function as shown in Formula 1 that is a weighted superposition of the depths of the divided regions. In Formula 1, w is the weighting factor, σ is the amount of variation, and the subscript i represents the divided region. In the example as shown in FIGS. 6A to 6C, the subscript i corresponds to the divided region 411 and the divided region 412.

[Formula 1]

$$d = \frac{\sum_i w(\sigma_i) d_i}{\sum_i w(\sigma_i)} \qquad \text{(Formula 1)}$$

In the examples as illustrated in FIGS. 6A to 6C, the weighting coefficient w of the divided region 411 in which the object is located in the vicinity of the overlap region and the variation amount is large is larger than the weighting coefficient w of the divided region 412 in which the variation amount is small. Then, the depth of the overlap region is set by adding the depth of the overlap region in the divided region 411 that has been calculated by using the large weighting coefficient w and the depth of the overlap region in the divided region 412 that has been calculated by using the small weighting coefficient w. Accordingly, the data combination processing unit 232 can set the depth in which the depth of the divided region 411, in which the object is located in the vicinity of the overlap region, is more reflected to the depth of the overlap region in the high-resolution depth data 204.

Note that although, in the present embodiment, an example of changing the weighting when the data are combined according to the variation in the distance information of the depth data has been explained, the present invention is not limited thereto. For other feature amounts such as color space information, luminance information, and defocus information of image data, the variation in the feature amount becomes larger in a case in which an object is present in the vicinity of the inside of the overlap region, similarly to the distance information. Therefore, it is also possible to change weighting when data are combined according to variations in other feature amounts such as color space information, luminance information, and defocus information of image data.

According to the present embodiment, it is not necessary to perform processing for preventing inconsistency of information between the layers of the network, and there is also no restriction on the processing order of the divided regions, and thus, the suitability for performing parallel processing is high, and the processing can be performed at high speed. Further, in the inference processing, it is not necessary to use all of the original data before the division, and the inference processing can be performed only for the divided regions that are the divided images, and as a result, the processing can be performed at a high speed. As described above, according to the present embodiment, it is possible to generate high-resolution depth data while suppressing a decrease in a processing speed.

Second Embodiment

Figure 7:
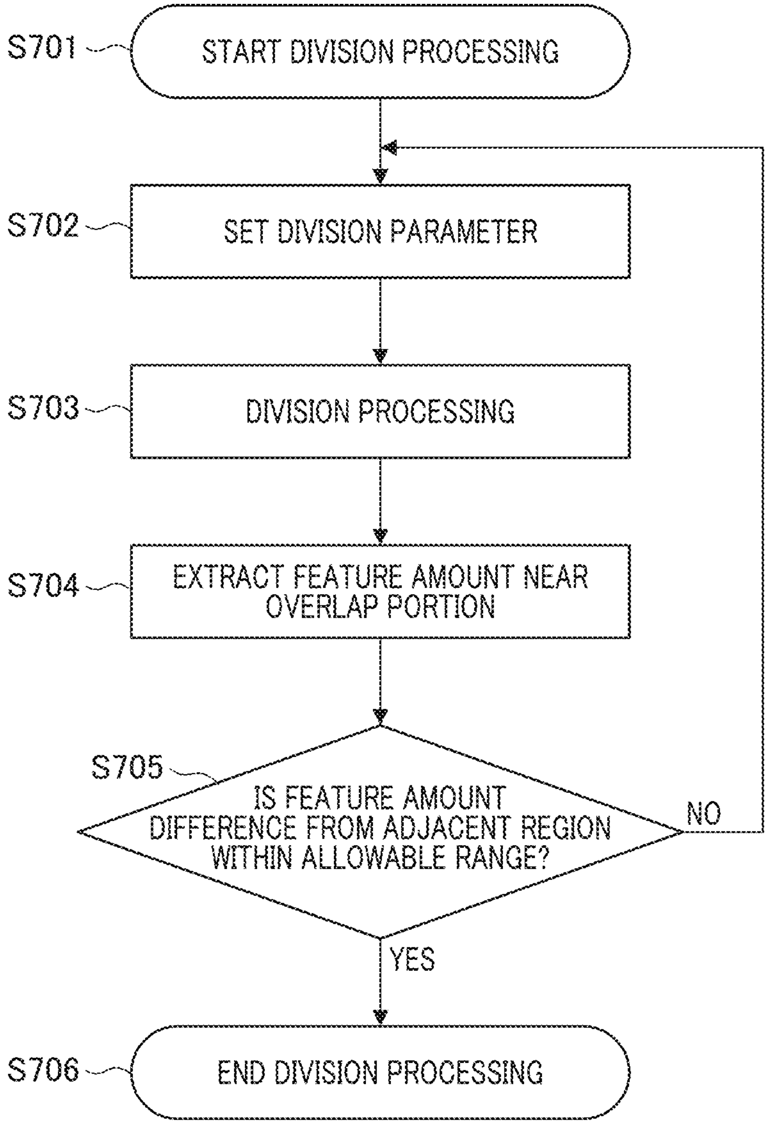
FIG. 7 is a flowchart showing the division processing in the second embodiment.

In the second embodiment, a case in which the size of the overlap region is variable in the division processing performed by the division processing unit 210 will be explained. A processing flow of the division processing unit 210 will be explained with reference to FIG. 7 and FIG. 8. FIG. 7 is a flowchart showing the division processing in the second embodiment. The processing executed by the division processing unit 210 illustrated in FIG. 7 is realized by the control unit 111 having a processor executing a program stored in the memory of the storage unit 114.

When the division processing unit 210 starts the division processing in S701, first, the division processing unit 210 executes a division parameter setting step in S702. In S702, the division processing unit 210 sets parameters related to the division processing such as a division region size and an overlap region size. Next, in S703, the division processing unit 210 divides the input depth data 201 and the image data 202 based on the parameters set in S702. The image data 202 are divided into the same division regions as the input depth data 201.

Next, in S704, the division processing unit 210 extract a feature amount of data in the vicinity of the overlap region including the overlap region, for each overlap region of each divided region. The details of the process of having the features extracted in S704 will be explained below. Next, in S705, the division processing unit 210 determines whether or not a difference (feature amount difference) in the variation of the feature amount from the adjacent region is within an allowable range. If the difference is within the allowable range, the division processing ends in S706. In contrast, if the difference is outside the allowable range, the process returns to S702. In the second or subsequent S702, the division processing unit 210 sets the parameters of the division processing such as the division region size and the overlap region size based on the feature amount extracted in S704. For example, the division processing unit 210 sets the parameters of the division processing such as the division region size and the overlap region size so that the difference in the feature amount from the adjacent region becomes small.

Figure 8:
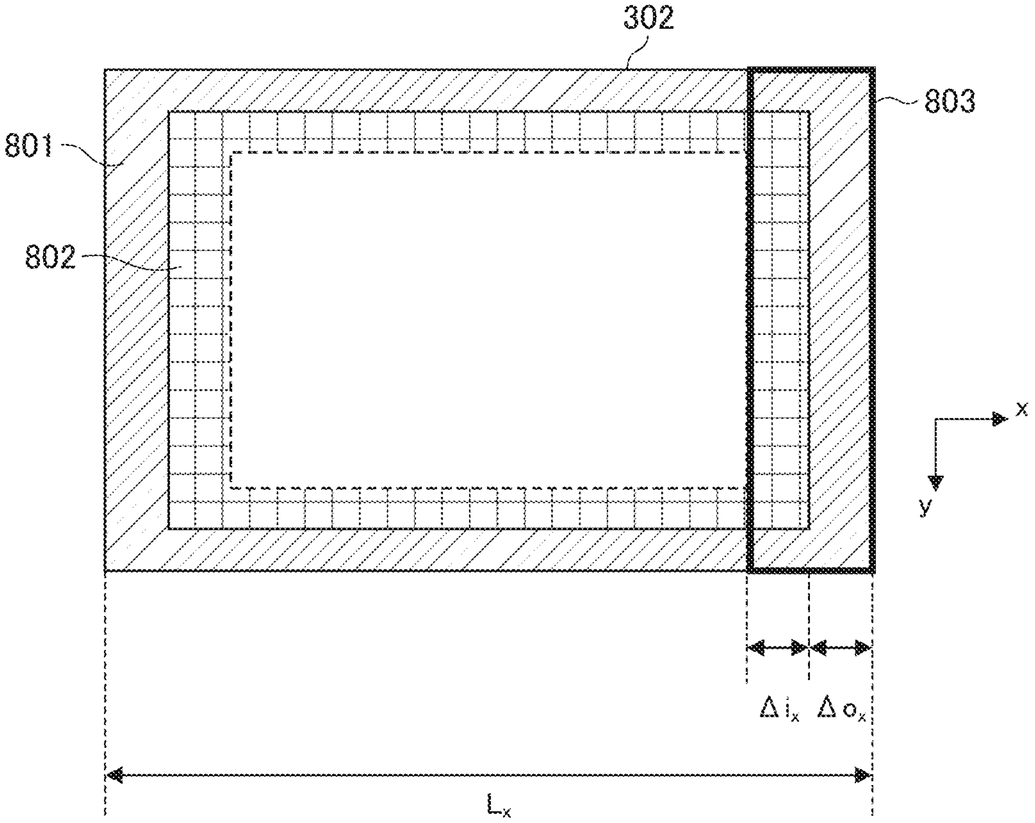
FIG. 8 is a diagram showing divided regions.

In this context, a process of extracting the feature amount in S704 will be explained with reference to FIG. 8. FIG. 8 is a diagram showing divided regions. FIG. 8 is the divided region 302 to which texture has applied in FIG. 3B and FIG. 3C. In FIG. 8, it is assumed that the longitudinal direction of the divided region 302 is the x-axis direction, and the short direction of the divided region 302 is the y-axis direction. The divided region 302 has an overlap region 801 overlapping with another divided region. A region 802 is an inner region adjacent to the overlap region 801. A region 803 is a region in the vicinity of an overlap region with an adjacent divided region in the +x direction. Specifically, the region 803 is a region including an overlap region with an adjacent divided region in the +x direction in the overlap region 801 and a region adjacent to the overlap region in the region 802. In S702, the division processing unit 210 sets the division region size Lx, the overlap size $\Delta o_x$, and the overlap region vicinity size $\Delta i_x$ in FIG. 8.

The inference processing performed by the inference processing unit 220 in the present embodiment can be regarded as complementation processing of complementing the low-resolution image depth data, which is the input depth image 201, with the high-resolution image data 202. Accordingly, the low-resolution image depth data of the region 802 also contributes to the high-resolution image depth data of the overlap region 801. Therefore, in the present embodiment, in the feature amount extraction process in S704, the frequency distribution of depth values in a region including the overlap region 803 and the region 802 inside the overlap region is extracted as a feature amount for each overlap region overlapping with an adjacent divided region of the input depth image 201. For example, for the adjacent divided region in the +x direction of the divided region 302 as shown in FIG. 8, the frequency distribution of depth values in the region 803 that is a region constituted by the overlap region in the +x direction and the region 802 inside the overlap region is extracted.

In S704, the division processing unit 210 extracts feature amounts of regions in the vicinity of each overlap region in the divided region of interest and divided regions that are adjacent to the divided region of interest. In addition, in S705, the division processing unit 210 determines whether or not the feature region difference is within an allowable range by determining whether or not the difference between the feature amounts of the regions in the vicinity of the overlap region of each divided region is equal to or smaller than a predetermined threshold. This is because, when the difference between the feature amounts of the regions in the vicinity of the overlap region that has been extracted from each divided region is equal to or smaller than a predetermined threshold, it can be regarded that the difference between the feature amounts in the overlap region of the high-resolution depth data output from the inference processing unit 220 is small.

In the present embodiment, the division processing is completed only when the difference between the feature amounts of the regions in the vicinity of the overlap region of the low-resolution input depth data 201 is small, and when the difference between the feature amounts is large, the division region size, the overlap region size, and the like are changed so that the difference between the feature amounts becomes small. As described above, according to the present embodiment, it is possible to set the division regions of the input depth data 201 and the image data 202 so as to reduce the difference between the feature amounts in the overlap region of the division regions of the high-resolution depth data after the inference processing.

By setting the divided regions in advance so that the difference between the feature amounts becomes small as described above, in the second embodiment, it is possible to omit the extraction processing of the feature amount from the high-resolution depth data after the inference processing that are performed by the feature amount extraction unit 231 of the combination processing unit 230 in the first embodiment. According to the second embodiment, data targeted for feature amount extraction is low-resolution input depth data, and the processing speed of the depth processing apparatus can be increased. Further, the data combination processing unit 232 can reduce the processing load by simplifying the processing, for example, by adopting one of the data obtained by the region division or by calculating the arithmetic mean when the overlap regions are combined.

Note that although, in the present embodiment, an example in which the input depth data 201 are used as information, which is the information targeted by feature amount extraction processing (S704) in the vicinity of the overlap region performed by the division processing unit 210 is explained, the present invention is not limited thereto. The information targeted by the feature amount extraction may be image data. Additionally, the feature amount extracted to determine the difference may be color space information, brightness information, and the like in addition to distance information.

Third Embodiment

Figure 9A:
FIGS. 9A to 9C are diagrams that explain processing contents of the division processing unit in the third embodiment.
Figure 9B:
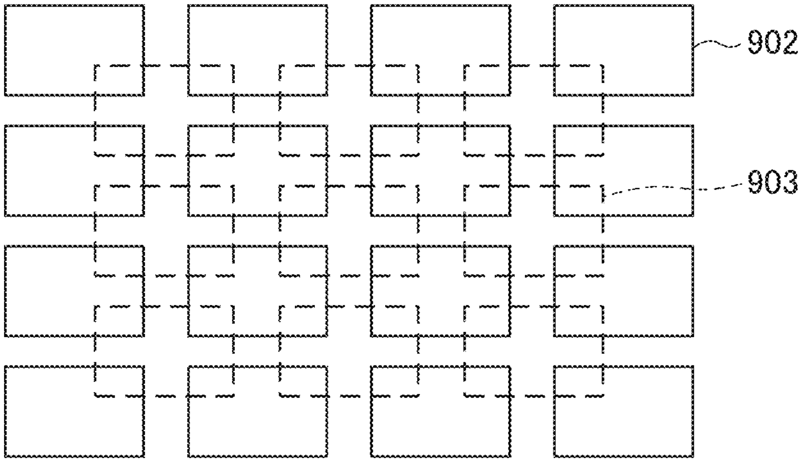
Figure 9C:
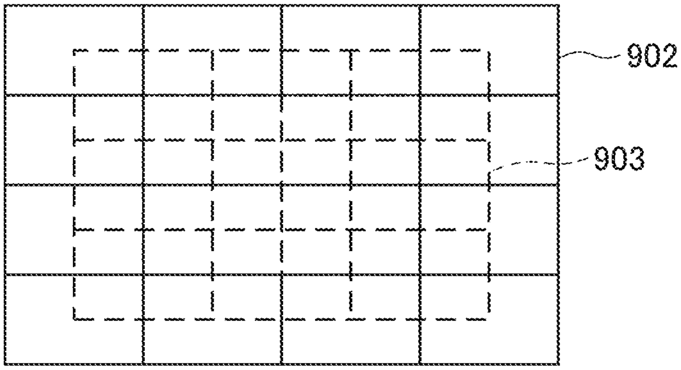

In the third embodiment, a case in which division processing is performed in the division processing unit 210 by a plurality of division methods will be explained. In the present embodiment, as an example, an example in which division into two types of divided regions of a first divided region and a second divided region is performed by two division methods will be explained. FIGS. 9A to 9C are diagrams illustrating the division processing in the third embodiment. Although in this case, the input depth data 201 that is low-resolution depth data will be explained as an example, the same also applies to the image data 202 that is a high-resolution image. Although the input depth data 201 that are low-resolution depth data are data such as a point group, the information processing apparatus 101 stores the input depth data 201 as two-dimensional data that servs as a desk map.

FIG. 9A is a diagram illustrating original data before division processing is performed. Original data 901 are input depth data 201 input from the depth acquisition unit 103 to the division processing unit 210 of the information processing apparatus 101. Although in this context, an example in which the original data 901 that are the input depth data 201 are divided into 16 (4×4) regions and 9 (3×3) regions will be explained, the number of divisions is not limited thereto.

FIG. 9B is a diagram showing a divided region. An example is illustrated in which the division processing unit 210 divides the original data 901 into a 4×4 first divided region 902 indicated by a solid line and a 3×3 second divided region 903 indicated by a broken line. The first divided regions 902 and the second divided regions 903 are divided after being shifted from each other by half the size of the divided region in both the vertical direction and the horizontal direction. FIG. 9C is a diagram for explaining the overlap of the divided region. The division processing unit 210 performs division such that the first divided regions 902 do not overlap with adjacent first divided regions. Similarly, the division processing unit 210 performs division such that the second divided regions 903 do not overlap with adjacent second divided regions. That is, the first divided regions and the second divided regions, that is, the divided regions obtained by the same dividing method, do not have an overlap region. In contrast, the first divided region and the second divided region, that is, the divided regions obtained by different dividing methods, have overlap regions.

Figure 10A:
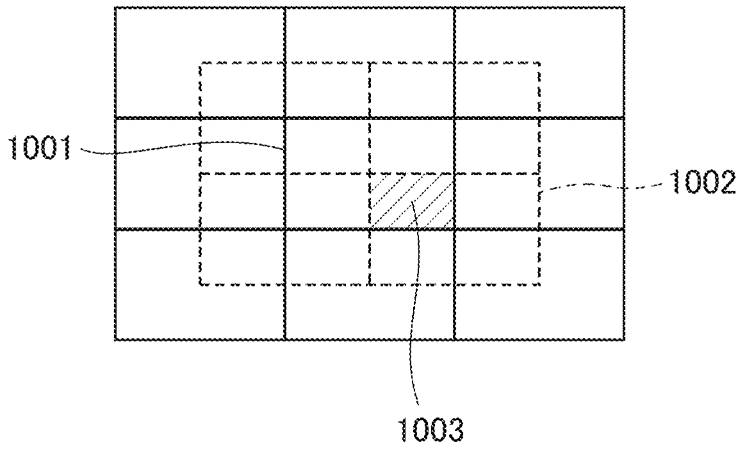
FIGS. 10A to 10C are diagrams that explain a combination processing unit in the third embodiment.
Figure 10B:
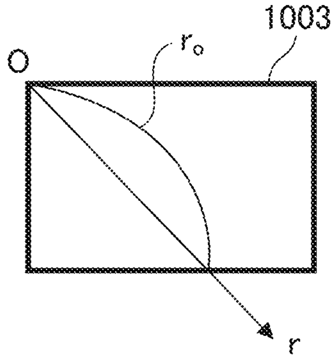
Figure 10C:
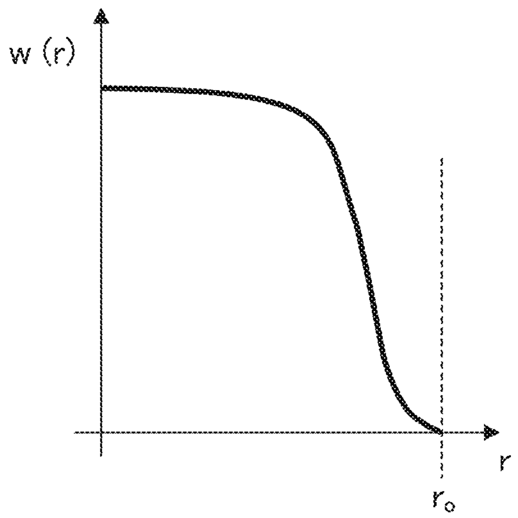

The combining processing for overlap regions in the third embodiment will be explained with reference to FIGS. 10A to 10C. FIGS. 10A to 10C are diagrams illustrating the combining processing in the third embodiment. FIG. 10A is a diagram explaining overlap regions. In the example as illustrated in FIG. 10A, the original data are divided into two types of divided regions, that is, a 3×3 first divided region indicated by a solid line and a 2×2 second divided region indicated by a broken line. A first divided region 1001 and a second divided region 1002 overlap each other in an overlap region 1003 to which a texture is applied.

In the third embodiment, similarly to the first embodiment, each divided region data having an overlap region is multiplied by a weighting coefficient and added together. Although, in the first embodiment, a feature amount including a variation of high-resolution depth data is used, in the third embodiment, a weighting coefficient is determined by a function of a distance of each divided region. Consequently, it is possible to omit the feature amount extraction processing for the high-resolution depth data that is necessary in the first embodiment, and it is possible to reduce the processing load in the combining processing.

FIG. 10B is a drawing showing the overlap region 1003. The center O is the center of the first divided region 1001. A distance from the center O is defined as a length r, and $r_o$ is defined as a distance to a point in contact with the first divided region boundary. FIG. 10C is a drawing showing the weighting coefficient w (r) corresponding to the distance r. In the present embodiment, the weighting coefficient is set so as to decrease as the distance r from the divided region central portion increases, that is, in the direction from the divided region central portion to the boundary portion. Therefore, the weighting coefficient is set so as to increase as the distance r from the divided region central portion decreases. Also in the second divided region 1002, a weighting coefficient, which is similar to that in the first divided region 1001, is set.

In the third embodiment, when combining the overlap region, the data combining processing unit 232 multiplies the high-resolution depth data of the first divided region and the high-resolution depth data of the second divided region by a function of the distance from the center of each divided region or a weighting coefficient set in a table, and adds them together. Specifically, a process expressed by Formula 2 below is performed. In this context, x in Formula 2 is a position of depth data, a function r; is a distance from the center of a divided region, w is a weighting coefficient, d is high-resolution depth data, a subscript i is a divided region. A position x of depth data is a pixel position of a depth map and image data. A weighting coefficient w is set by a function of a distance r from the center of a divided region or a table.

[Formula 2]

$$d(x) = \frac{\sum_i w(r_i(x))d_i}{\sum_i w(r_i(x))} \quad \text{(Formula 2)}$$

In the third embodiment, because the number of overlap regions is larger than those in the first embodiment and the second embodiment, it is necessary to process data twice as large as the original data at the maximum. In contrast, in the third embodiment, it becomes possible to omit the processing of extracting the feature amount in the feature amount extraction unit 231 of the combination processing unit 230 in the first embodiment, extracting the feature amount in the division processing unit 210 in the second embodiment, and setting a division parameter. These processes that can be omitted are processes that discontinuously access data on the storage unit 114 and may result in performance degradation. Although, in the third embodiment, the amount of data to be processed increases, the frequency of discontinuous memory access decreases. Therefore, in the third embodiment, the compatibility with the many-core architecture represented by the GPU capable of processing a large amount of data is high, and the execution efficiency becomes high, and as a result, the scalability with respect to the data size is excellent.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-212412, filed Dec. 28, 2022, which is hereby incorporated by reference wherein in its entirety.

What is claimed is:

1. An information processing apparatus comprising:
at least one processor and/or circuit configured to function as following units:
a division processing unit configured to divide each of input depth data and image data corresponding to the input depth data and having a higher resolution than the input depth data into a plurality of divided regions;
an inference processing unit configured to infer depth data by complementing input depth data with image data for each of the divided regions; and
a combining processing unit configured to combine depth data having a higher resolution than that of input depth data by combining inferred depth data in the divided regions,
wherein the division processing unit performs division such that each divided region has an overlap region partially overlapping with an adjacent divided region,
wherein the combining processing unit extracts a feature amount of the overlap region in the divided region and combines depth data in the overlap region based on the feature amount.

2. The information processing apparatus according to claim 1, wherein the feature amount is a statistical index related to one or more of color space information of image data, luminance information of image data, distance information of depth data, and defocus information of depth data.

3. The information processing apparatus according to claim 1, wherein in a case in which an overlap region is combined from a plurality of overlapping divided regions, the combining processing unit performs combining by changing weighting of depth data in a divided region according to variation in the feature amount in the overlap region.

4. The information processing apparatus according to claim 1, wherein in a case in which the feature amount is a variation in distance information of depth data, the combining processing unit performs combination such that a weighting of depth data in a divided region in which a variation in distance information is large becomes larger than a weighting of depth data in a divided region in which a variation in distance information is small, during combination of an overlap region.

5. The information processing apparatus according to claim 1, wherein the division processing unit sets a size of a division region and a size of an overlap region based on a feature amount of a predetermined region including the overlap region and a region in the vicinity thereof of the input depth data.

6. The information processing apparatus according to claim 5, wherein, in the input depth data, the division processing unit performs setting of a size of a division region and a size of an overlap region such that a difference between the feature amounts of the predetermined regions in each of division regions in which the overlap regions overlap is smaller than a predetermined value, and performs division.

7. A control method of an information processing apparatus, the method comprising:
dividing each of input depth data and image data corresponding to the input depth data and having a higher resolution than the input depth data into a plurality of divided regions;
inferring depth data by complementing input depth data with image data for each of the divided regions; and
combining depth data having a higher resolution than input depth data by combining inferred depth data in the divided region,
wherein, in the dividing, division is performed such that each divided region has an overlapping region partially overlapping with an adjacent divided region,
wherein the combining processing unit extracts a feature amount of the overlap region in the divided region and combines depth data in the overlap region based on the feature amount.

8. A non-transitory storage medium storing a control program of an information processing apparatus causing a computer to perform each step of a control method of the information processing apparatus, the method comprising:
dividing each of input depth data and image data corresponding to the input depth data and having a higher resolution than the input depth data into a plurality of divided regions;
inferring depth data by complementing input depth data with image data for each of the divided regions; and
combining depth data having a higher resolution than input depth data by combining inferred depth data in the divided region,
wherein, in the dividing, division is performed such that each divided region has an overlapping region partially overlapping with an adjacent divided region,
wherein the combining processing unit extracts a feature amount of the overlap region in the divided region and combines depth data in the overlap region based on the feature amount.

9. An information processing apparatus comprising:
at least one processor and/or circuit configured to function as following units:
a division processing unit configured to divide each of input depth data and image data corresponding to the input depth data and having a higher resolution than the input depth data into a plurality of divided regions;
an inference processing unit configured to infer depth data by complementing input depth data with image data for each of the divided regions; and
a combining processing unit configured to combine depth data having a higher resolution than that of input depth data by combining inferred depth data in the divided regions,
wherein the division processing unit performs division such that each divided region has an overlap region partially overlapping with an adjacent divided region,
wherein the division processing unit divides each of the input depth data and the image data into a plurality of divided regions by a plurality of division methods, divided regions divided by the same division method do not have an overlap region, and divided regions divided by different division methods have an overlap region, and
wherein the combining processing unit combines depth data according to a distance from the center of an overlapping divided region, during combination of the overlapping region.

* * * * *